United States Patent
Krogsgaard et al.

(10) Patent No.: US 12,460,773 B2
(45) Date of Patent: Nov. 4, 2025

(54) ADVANCED CASCADE FILLING OF RECEIVING VESSELS

(71) Applicant: Everfuel Europe A/S, Herning (DK)

(72) Inventors: Jacob Bech Krogsgaard, Holstebro (DK); Jeppe Hjuler Mikkelsen, Egå (DK); Magnus Haugaard Rønne, Herning (DK)

(73) Assignee: EVERFUEL EUROPE A/S, Herning DK (DK)

( * ) Notice: Subject to any disclaimer, the term of this patent is extended or adjusted under 35 U.S.C. 154(b) by 0 days.

(21) Appl. No.: 18/026,885

(22) PCT Filed: Sep. 22, 2021

(86) PCT No.: PCT/DK2021/050295
§ 371 (c)(1),
(2) Date: Mar. 17, 2023

(87) PCT Pub. No.: WO2022/069009
PCT Pub. Date: Apr. 7, 2022

(65) Prior Publication Data
US 2023/0332745 A1 Oct. 19, 2023

(30) Foreign Application Priority Data

Oct. 2, 2020 (DK) .......................... PA 2020 70671

(51) Int. Cl.
*F17C 5/00* (2006.01)
(52) U.S. Cl.
CPC .................................... *F17C 5/007* (2013.01)
(58) Field of Classification Search
CPC ............... F17C 5/007; F17C 2221/012; F17C 2227/043; F17C 2250/043
See application file for complete search history.

(56) References Cited

U.S. PATENT DOCUMENTS

| | | |
|---|---|---|
| 2006/0118175 A1 | 6/2006 | Mathison |
| 2013/0240080 A1 | 9/2013 | Pick |

(Continued)

FOREIGN PATENT DOCUMENTS

| | | |
|---|---|---|
| EP | 1146277 A1 | 10/2001 |
| EP | 3249282 A1 | 11/2017 |

(Continued)

OTHER PUBLICATIONS

Danish Search Report for corresponding application PA 2020 70671; Report dated Apr. 13, 2021.

(Continued)

*Primary Examiner* — Jason K Niesz
(74) *Attorney, Agent, or Firm* — CANTOR COLBURN LLP (57) ABSTRACT

A method of refueling a receiving vessel system with a gas from a supply vessel system, where the receiving vessel system is connected to the supply vessel system via a flow line, the receiving vessel system including a plurality of receiving vessels and the supply vessel system having a plurality of supply vessels, where the flow of gas from the supply vessel system to the receiving vessel system is controlled by a refueling controller based on information related to pressure from the plurality of supply vessels and from the plurality of receiving vessels, and, on the received information, a match between a supply vessel and a receiving vessel is determined and based on the match, controlling the status at least one supply vessel valve and at least one receiving vessel valve to allow flow between the matched supply vessel and receiving vessel.

18 Claims, 4 Drawing Sheets

(56) References Cited

U.S. PATENT DOCUMENTS

| | | |
|---|---|---|
| 2014/0261864 A1 | 9/2014 | Cohen |
| 2018/0080608 A1* | 3/2018 | Reddi |
| 2021/0231263 A1* | 7/2021 | Thibaut .................. F17C 5/007 |
| 2021/0396356 A1* | 12/2021 | Charbonneau ............ F17C 7/00 |

FOREIGN PATENT DOCUMENTS

| | | | |
|---|---|---|---|
| KR | 1020070037733 A | | 4/2007 |
| WO | 2009079276 A2 | | 6/2009 |
| WO | 2020103993 A1 | | 5/2020 |
| WO | 2020147911 A1 | | 7/2020 |

OTHER PUBLICATIONS

International Search Report for corresponding application PCT/DK2021/050295 filed Sep. 22, 2021; Mail date Mar. 7, 2022.
Written Opinion for corresponding application PCT/DK2021/050295 filed Sep. 22, 2021; Mail date Mar. 7, 2022.

* cited by examiner

ADVANCED CASCADE FILLING OF RECEIVING VESSELS

TECHNICAL FIELD

The disclosure relates to a method of filling a plurality of receiving vessels of a receiving vessel system with a gaseous fluid such as hydrogen gas and a temporary refueling system implementing this method.

BACKGROUND

Cascade fueling principles are well known in the art. One example is US2006/0118175 where a reduced energy method used to refuel a number of vehicle vessels is disclosed. Vessel inlets are configured with valves which close to prevent backflow and the refilling line simultaneously connects to the inlet to each tank, a tank check valve allows hydrogen to flow into a first on board tank with the lowest pressure. Since the multiple on-board tanks will be at different pressure levels when the refilling process begins, hydrogen gas will naturally flow to the tank with the lowest pressure first, until it reaches the pressure of the next highest tank, where upon the hydrogen gas will commence flowing into both the first tank and the second tank simultaneously. This process will continue to progress until the tank pressures reach the maximum pressure available from the refilling line.

Accordingly, cascade fueling principles requires a higher pressure in the source vessel compared to the pressure in the receiving vessels. In particular according to the above-mentioned method, at the beginning of a refueling, to be able to complete as much of the refueling according to the cascade principles as possible, the pressure difference between source vessel and the vehicle vessel having the lowest pressure is significant. Large pressure difference is leading to decompression, which is accompanied by temperature increase in the receiving vessel which therefore is in risk of exceeding the safe temperature range of the vessel.

A further disadvantage related to the above-mentioned method is that a compressor is required to operate to establish the high pressure in the source vessels which requires energy.

BRIEF SUMMARY

The present disclosure solves the above problems by matching pressure in a source vessel with pressure in a receiving vessel. In this way the optimal flow of a refueling following the cascade principles with respect to temperature increase inside the receiving vessel can be established. Further, the pressure difference between the source and receiving vessels can be optimized leading to a reduction of pressure level in the source vessels and thereby saved energy used on operating compressor to establish high pressure in the source vessels. Accordingly, the present disclosure has the advantage of increasing fueling capability and reducing energy consumption.

The disclosure relates to a method of refueling a receiving vessel system with a hydrogen gas from a supply vessel system,
- the receiving vessel system is fluidly connected to the supply vessel system via at least one hydrogen flow line,
- the receiving vessel system comprising a plurality of receiving vessels and receiving vessel valves,
- the supply vessel system comprising a plurality of supply vessels and supply vessel valves,
- wherein the flow of hydrogen gas from the supply vessel system to the receiving vessel system is controlled by a refueling controller, the method is characterized in that the refueling controller:
- establishes information related to pressure from at least one of the plurality of supply vessels and from at least one of the plurality of receiving vessels,
- based on the established information, determine a match between at least one supply vessel and at least one receiving vessel, and
- based on the match, controlling the status at least one supply vessel valve and at least one receiving vessel valve to allow flow between the matched supply vessel and receiving vessel so that the at least one of the plurality of receiving vessels are filled to its target pressure by flow of hydrogen gas directly from two or more of the plurality of supply vessels.

This method is advantageous in that it has the effect, that the pressure differences between the source vessels and the receiving vessels, especially in the beginning of the refueling, can be reduced in that the optimal match between source and receiving vessel is found. Further, this method has the effect that the capacity of the refueling system is increased and energy consumption at the site of the refueling system is reduced or eliminated (at least with respect to external power supply). Further, this method has the effect, that the refueling can be optimized with respect to energy consumption, refueling time and emptying of supply vessels.

This method is furthermore advantageous compared to known cascade-based fill systems in that it leads to a better exploitation of the pressurized gas of the supply system and typically a higher state of charge in more vessels of the receiving system. Exploitation covers energy used to pressurize the gas in the supply vessels and the number of receiving vessels that are filled to target pressure. This is obtained by providing small pressure differences between the supply and receiving vessels. Further, as mentioned below, the exploitation of pressurized gas in the supply system is optimized if control over receiving vessel valves is possible.

Hence according to the present disclosure, the receiving vessels that are completely filled are filled to a desired target value such as a value of density, pressure or temperature directly from the supply vessels i.e. without the use of a compressor.

The advances cascade filling according to the disclosure can also be referred to as double cascade filling in that it include cascading vessels of both supply and receiving systems According to an exemplary embodiment, the supply vessel and a receiving vessel are matched if the pressure in the supply vessel is higher than the pressure in the receiving vessel, wherein the difference is at least 10 bar, preferably at least 35 bar, most preferably at least 50 bar.

The exact pressure the supply storage has to be higher than the receiving vessel depends on the required flow speed. Hence, if time is short high flow speed is necessary and therefore high-pressure difference is required such as up to or above 100 bar. On the other hand, if time is not an issue e.g. if the refueling event is allowed to take the whole night, the flow speed need not to be that high and a pressure difference between 10 bar and 100 bar may be sufficient. As a general rule, the lower pressure difference, the lower flow speed and higher exploitation of the pressurized gas in the supply system. The efficiency of exploitation of the pressurized gas in the supply system decreases with increasing pressure difference between supply and receiving vessel.

A pressure is sufficiently higher e.g. if a target flow of hydrogen gas can be established between the supply and receiving systems. Alternative, a sufficiently high pressure can be established by knowledge of a flow coefficient i.e. a value indicating resistance experiences by the flow of hydrogen gas in pipes and vessels leading to heat dissipation in the receiving vessel system or of pressure drop. The target flow speed of hydrogen gas may also be precalculated or determined based on experiences from previous fueling events.

According to an exemplary embodiment, the same receiving vessel is filled from at least a first and a second supply vessels before being completely filled, wherein the pressure of the first supply vessel is lower than the pressure of the second supply vessel, and wherein the receiving vessel is supplied from the first supply vessel and subsequently from the second supply vessel. This also implies that each of the supply vessels are used to fill more than one of the receiving vessels.

It should be mentioned that at the beginning of the refueling event, all supply vessels may have the same start pressure. If this is not the case, then the advanced cascade principles may still be applied, just the sequence of when to use the supply vessel have to be arranged according to the different pressure levels.

This is advantageous in that it has the effect, that the decompression of the first and second supply vessels related to the filling of the receiving vessel is reduced in that pressure difference between the receiving vessel and the supply vessels can be kept at a minimum.

According to an exemplary embodiment, the receiving vessel is filled from at least 5 different supply vessels, preferably from at least 4 different supply vessels and most preferably from at least 3 three different supply vessels.

This is advantageous in that it has the effect, that the refueling steps in terms of pressure difference are reduced and thereby the decompression of the supply vessels is reduced leading to optimized refueling at least in terms of overall energy consumption (at least or including energy used to compress hydrogen gas in the supply vessels) and in terms of refueling speed. In general, for the advanced cascade filling according to the present disclosure to work, the supply system need to have at least two vessels more than the receiving system.

According to an exemplary embodiment, the receiving vessel is part of a marine vessel.

Filling a vessel of a marine vessel according to the above method is advantageous in that marine vessel typically have large volume fuel vessels (in the context of the present disclosure referred to as receiving vessel) i.e. performing a refueling according to the prior art cascade principles would not be suitable in many situations. At least where there are not stationary refueling system at the harbor where the refueling of the vessels of the marine vessel is made.

According to an exemplary embodiment, the refueling controller receives pressure information from the plurality of supply vessels and/or receiving vessels continuously during the refueling.

Being provided with pressure indications from supply and receiving vessels continuously during a refueling is advantageous for the refueling controller to be able to select the best point in time to match a supply vessel with a receiving vessel. Hence, the total amount of hydrogen gas supplied to the receiving vessels may not necessarily be relevant information just after termination of the refueling since this information can be established when refueling the supply storages based on knowledge of how much hydrogen gas that was present in the supply storages when the refueling of the receiving vessels started.

According to an exemplary embodiment, the supply vessel system is temporary located at the refueling site, preferably as part of a truck trailer.

This is advantageous in that the availability of the refueling system is high in that if a trailer fails or lacks capacity, a new trailer can be provided in a short time. Further, no huge construction costs are necessary to establish a stationary refueling station which would require a significant number of refuelings to be profitable in contrary to a truck trailer which can be provided the one time one e.g. marine vessel needs to be refueled in a particular harbor. The present disclosure is particular advantageous in that the trailer has no compressor and thereby no energy consumption and noise form the compressor on site. Because no compressor is present, the advanced cascade filling principle of the present disclosure provides for an optimized utilization of the hydrogen gas in the banks of the trailer which is required to ensure the best possible utilization of the energy that has been used to compress the hydrogen gas in the storages of the trailer. The trailer is preferably a MEGC trailer (MEGC; Multiple-Elements Gas Container). With this said, the supply vessel system may also be stationary such as a hydrogen refueling station.

According to an exemplary embodiment, the refueling controller is located at the trailer.

Locating the refueling controller on the trailer is advantageous in that it has the effect, that it is possible to stop the refueling if something goes wrong on the vessel leading to increased safety. If the situation should occur, that the vessel leaves the refueling system, before the refueling is completely finished, the refueling can be stopped from the trailer on the harbor, hence no hoses with leaking hydrogen gas can be left uncontrolled in this situation.

According to an exemplary embodiment, the refueling controller is controlling the receiving vessel valves.

If the refueling controller is located at the trailer on shore, then via e.g. a wire or wireless communication path, the refueling controller is able to control (open or close) the valves at the receiving vessel system. This is advantageous in that no refueling controller is needed at the receiving vessel system which reduced complexity and total costs. It should be mentioned, that the refueling controller may indirectly e.g. via controlling flow of hydrogen to the receiving vessel system or via a controller of the refueling vessel system control the receiving vessel valves.

According to an exemplary embodiment, the refueling controller is located as part of the receiving vessel system and controlling the supply vessel valves.

This is advantageous in that it has the effect, that the complexity of the supply vessel system e.g. of a trailer is reduced. Hence, only a trailer with several supply vessels and valves are needed.

According to an exemplary embodiment, the fluid connection between supply vessel system and receiving vessel systems is double or triple.

This is advantageous in that it has the effect, that refueling speed can be increased. Note that the disclosure is not limited to have two or three parallel hoses/gaseous connections between the supply and receiving vessels systems. The appropriate number of connections depends e.g. on the size i.e. on the number and volume of the plurality of vessels of both the supply system and of receiving system. The increase in speed may be achieved in that, when the desired equalization between supply vessel 1 and receiving vessel 1 is obtained, then continue filling receiving vessel 1 from supply vessel 2 simultaneously with filling receiving vessel 2 from supply vessel 1.

According to an exemplary embodiment, the flow of hydrogen gas to each of the plurality of receiving vessels are controlled by a valve assigned to each individual of the receiving vessels or to a receiving vessel bank comprising more than one receiving vessels.

According to an exemplary embodiment, the flow of hydrogen gas from each of the plurality of supply vessels are controlled by a valve assigned to each individual of the supply vessels or to a supply vessel bank comprising one or more supply vessels.

According to an exemplary embodiment, the pressure information and valve control signals are communicated between at least two of the list comprising: refueling controller, receiving vessel sensor, receiving vessel valves, supply vessel sensor and supply vessel valves via a wired communication line or wireless communication line.

At least the communication of pressure and/or temperature from the receiving vessels to the refueling controller may be considered important information and thus have influence on the fueling speed and state of charge of the receiving vessels at the end of the refueling. Hence, these signals may preferably be communicated via a safe communication protocol to be able to establish a handshake which is important in that in this way it can be determined if it is e.g. the correct receiving vessel the information origins from and that is based thereon to be refueling.

According to an exemplary embodiment, the receiving vessels of the receiving vessel system is filled to a temperature compensated target pressure.

A temperature compensate target pressure should be understood as the end pressure of the refueling event that takes the gas temperature in consideration. Hence, the lower the gas temperature is, the higher pressure can be allowed while at the same time ensuring not to exceed a predefined density defined as 100% state of charge. As a non-limiting example, it may be possible to stop the refueling event of a 250 bar system at a temperature compensated target pressure of 260 bar. This is advantageous in that it has the effect, that the receiving vessel is filled with a higher density of hydrogen gas compared to the situation where the refueling event terminated at a non-temperature compensate target pressure of 250 bar.

According to an exemplary embodiment, the refueling controller controls the flow speed in the fluid connection between supply vessel system and receiving vessel system allowing the highest mass of hydrogen gas to by filled into the vessels of the receiving vessel system within a predetermined period of time.

This is advantageous in that then trailer (in case the supply vessel system is implemented on a trailer) swap or end of refueling can be planned. The flow speed may also be optimized according to optimal fill performance i.e. refueling based on reduce total energy consumption, lowest pressure in supply vessels at the end of a refueling event, reduced time for refueling event, temperature development in receiving vessel, etc. A predetermine period of time could e.g. be less than 2-5 hours, less than 1 hour, less than 45 minutes or less than 30 minutes.

According to an exemplary embodiment, a consumer controller controls the consumption of hydrogen gas from the receiving vessel system so as to reduce pressure in the receiving vessels asynchronously.

This is advantageous in that it has the effect, that the advanced cascade refueling principles can be exploited best possible if the pressure in at least two of the refueling vessels are not the same.

According to an exemplary embodiment, at least one receiving vessel is only filled to a certain reference fill, wherein the reference fill is 60% of receiving vessel maximum capacity, preferably to 75% of receiving vessel maximum capacity, most preferably to 95% of receiving vessel maximum capacity.

Only refueling the hydrogen gas that is needed for a return trip of a vehicle or marine vessel into the receiving vessels 8 thereof, is advantageous in that it has the effect that energy consumption is reduced both with respect to the refueling and to the consumption of hydrogen gas during operation of the vehicle/marine vessel due to the reduced weight of the fuel (hydrogen gas).

Further, refueling to a certain reference fill such as 200 bar makes it possible to empty the supply vessel system to a lower pressure level before, in case the supply vessel system is a trailer, returning to a central storage or hydrogen production facility. This least to total saved energy of a fueling event.

According to an exemplary embodiment, the consumer controller controls the consumption of hydrogen gas so that before initiating a refueling event,
the pressure of at least a first of the plurality of receiving vessels are below 50% of the pressure of the first receiving vessel at the beginning of the consumption of hydrogen gas from the first receiving vessel, and
the pressure of at least a second receiving vessels is above 50% of the pressure of the second receiving vessel at the beginning of the consumption from the second receiving vessel.

This is advantageous in that it has the effect, that the receiving vessel system comprise receiving vessel having at least two different pressures prior to a refueling event, which facilitates the advanced cascade refueling principles of the present disclosure. It should be noted that the consumer controller may also control the consumption so that the relationship between current (prior to refueling event) and initial (prior to consumption starts) pressure of a receiving vessel prior to a refueling event is 25%, 75% and any other percentages.

According to an exemplary embodiment, information related to pressure is received by the refueling controller from a plurality of receiving vessels. In this way the best match between supply and receiving vessels can be made and thereby best possible exploitation of energy used to pressurize the supply storages can be made. The pressure related information from the supply vessels may be known by the refueling controller either from the initial pressure/information or from information obtained when flow from a particular supply vessel stops.

According to an exemplary embodiment, the same supply vessel is used to refuel at least 3 receiving vessels, preferably at least 4 and most preferably at least 5. This is advantageous in that the higher number of receiving vessels one supply vessels is source of, the more it is emptied, and the less hydrogen gas has to be moved to another supply vessel or returned home to the location where the supply storages are refueled (if the supply vessels are e.g. located on a truck trailer) i.e. the better exploitation of the pressurized gas in the supply system.

According to an exemplary embodiment, the refueling controller is rematching one supply vessel that has been used as source for one receiving vessel with another receiving vessel. This continuous matching and/or rematching of supply vessels and receiving vessels are advantageous in that (preferably all) receiving vessels of the receiving vessel system can be filled to target pressure directly from two or more supply vessels i.e. without using a compressor.

According to an exemplary embodiment, at least two receiving vessels are filled to their target pressure with hydrogen gas directly from three different supply vessels.

Moreover, the disclosure relates to a stationary refueling station comprising the supply vessel system connectable to a movable receiving vessel system. Stationary should be understood as not intended to be moved between two subsequent refuelings. The receiving vessel system being movable should be understood as it being part of a ship, train, airplane or similar movable object or vehicle.

Moreover, the disclosure relates to a refueling system configured for refueling of a receiving vessel system comprising a plurality of receiving vessels, the temporary refueling system comprising a plurality of supply vessels,
  wherein the receiving vessel system is fluidly connected to the supply vessel system via at least one hydrogen gas gaseous connection,
  wherein a refueling controller is configured to control the flow of hydrogen gas from the supply vessel system to the receiving vessel system, based on information established related to pressure inside at least one of the plurality of supply vessels,
  wherein the refueling controller, based on the received pressure information, is configured to determine a pressure match between at least one supply vessel and at least one receiving vessel, and based on the match the refueling controller is configured for controlling the status at least one supply vessel valve to allow flow of hydrogen gas from the supply vessel to the matched receiving vessel.

According to an embodiment, the refueling system is temporary. A temporary refueling system as described above is advantageous in that it has the effect, that it can be moved from refueling site to refueling site depending on where the vessel or vehicle comprising the receiving vessel system is located.

At the beginning of a refueling of receiving vessels i.e. an initial condition such as pressure information of the individual vessels of the supply system is known or received by the controller. The pressure in each supply vessel may be substantially the same, one or more supply vessels may be emptied or having a lower pressure.

According to an exemplary embodiment, the refueling controller furthermore is configured to establish information related to pressure inside at least one of the plurality of receiving vessels.

This is advantageous in that it has the effect, that not only a match between a supply storage and what the refueling controller considers as the receiving vessel having the lowest pressure can be established. Hence, the refueling controller is able to match a supply and receiving vessel according to knowledge of pressure inside the vessels leading to a better match. A pressure in a receiving vessel may be established by opening a valve on the supply side to allow a minor amount of gas at a first pressure to escape to a receiving vessel. This may be repeated until a pressure equalization therebetween is reached and thereby pressure in the receiving vessel is established.

According to an exemplary embodiment, the receiving vessels are fluidly connected to the supply vessels through check valves.

This is advantageous in that it has the effect, that only the supply vessel valves need to be controlled and thereby communicatively connected to the refueling controller.

According to an exemplary embodiment, the receiving vessels are connected through actuated valves.

This is advantageous in that it has the effect, that the robot controller, via communicatively connection, are able to control the refueling vessel valves.

According to an exemplary embodiment, wherein the receiving vessel system is part of a marine vessel.

According to an embodiment, the number of supply vessels of the supply vessel system is at least n+2, where n is the number of receiving vessels of the receiving vessel system. Having at least 2 (gladly more) supply vessels more than receiving vessels is advantageous in that then, if controlled proper, there will always be one supply vessel with initial pressure to ensure complete the "last" receiving vessel i.e. to ensure all receiving vessels are completely full (at 100% State of Charge). Initial pressure should be pressure at the supply vessels at the start of the refueling of the receiving vessel.

According to an exemplary embodiment, the plurality of supply vessels is part of a MEGC trailer for transportation and temporary storage of a pressurized gaseous fluid, wherein the MEGC trailer comprising:
  at least two gas banks, wherein each of said two gas banks comprises at least one gas section, wherein said at least one gas section comprises at least one gas vessel, wherein said at least one gas vessels is configured for temporary storage of said pressurized gaseous fluid;
  a plurality of section valves, wherein each gas section is associated with one of said plurality of section valves which is configured for controlling flow of said pressurized gaseous fluid to and from said gas section;
  a fluid conduit system arranged to fluidly couple, through said section valves, gas sections within each of said at least two gas banks, wherein said fluid conduit system comprises a first coupling valve and a second coupling valve;
  said first coupling valve is configured for establishing a fluid connection between a first of the at least two gas banks and a first outlet connection and
  said second coupling valve is configured for establishing a fluid connection between a second of the at least two gas banks and a second outlet connection,
  wherein said first and second outlet connections are both configured for connecting said fluid conduit system to an external facility and thereby facilitate two-way gaseous fluid communication between the MEGC trailer and the external facility, and
  wherein the fluid conduit system furthermore comprises a first and a second bank valve between which an additional gas section is connected to the fluid conduit system via an additional section valve,
  wherein said first and second bank valves and said additional section valve are controllable so as to change the volume of at least one of the at least two gas banks with the volume of said additional gas section.

The fluid conduit system is advantageous in that it has the effect, that it allows simultaneous flow from and to the MEGC (MEGC; Multiple-Elements Gas Container) trailer. Thereby it is possible to perform reloading between a first gas bank and a second gas bank of the MEGC trailer i.e. increasing pressure in a first gas bank while decreasing pressure in a second gas bank. This is leading to a better utilization of the trailer including a more effective emptying of the gas banks prior to a trailer swap when the trailer is used as a storage connectable to an external facility such as a hydrogen refueling station or used as a hydrogen refueling station connectable to an external facility such as a receiving vessel system of a fuel cell vehicle, marine vessel, airplane, train, etc. or a supply storage system at which the trailer can be filled.

According to an exemplary embodiment, said MEGC trailer comprises at least one sensor unit configured to record a physical state of said pressurized gaseous fluid of at least one of said gas sections to provide a representation of said physical state; and an electrical monitoring unit configured to receive said representation of said physical state.

The at least one sensor unit is configured to record a physical state of the pressurized gaseous fluid is preferably communicatively connected to the electric monitoring unit and is advantageous in that it has the effect, that on the trailer, data related to status of gaseous fluid in the gas vessels are monitored and stored. This is particularly useful in the context of reloading, where information relating to the physical state of the gas is important. The physical state of the gas, which the at least one sensor unit is configured to record, may for example be temperature, pressure, or location (section) of the gas. These measured values may be used to control fueling, reloading, etc. It may further be advantageous to record a physical state of the pressurized gaseous fluid before and after performing fueling, which allows metering the amount of pressurized gaseous fluid which was fueled. Preferably all recorded data is time stamped.

According to an exemplary embodiment, a controller is configured to control the status of at least one of the section valves, coupling valves and bank valves based on the trailer information data.

The controller may be an internal trailer controller or an external controller such as the controller of a hydrogen refueling station or receiving vessel system. In embodiments, these valves may also be controlled manually.

According to an exemplary embodiment, said fluid conduit system comprises three or more bank valves, configured for controlling the number of gas sections included in three or more gas banks.

This is advantageous in that it has the effect that the volume of the gas banks can be controlled by controlling the status of the first and second bank valves, leading to a flexible MEGC trailer. More specific, it is possible to increase or decrease i.e. vary the volume of two gas banks and thereby the volume of a high-pressure gas bank and a low-pressure gas bank.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
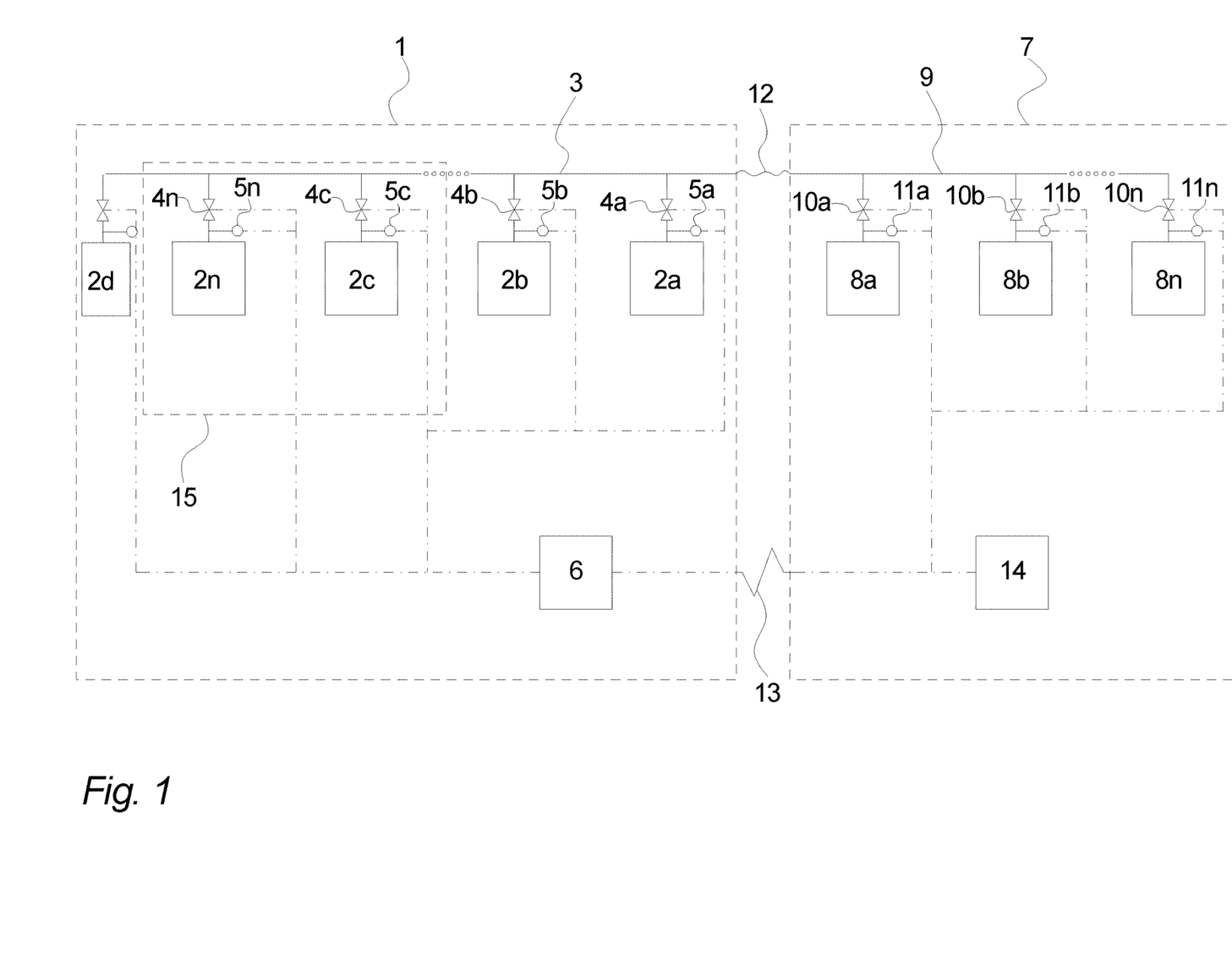
FIG. 1 illustrates a supply vessel system and a receiving vessel system according to an embodiment of the disclosure.

FIG. 1 illustrates a supply vessel system 1 according to an embodiment of the disclosure. The supply vessel system comprising a plurality of supply vessels 2a-2n (commonly denoted 2) that is fluidly connected via fluid connections 3. The fluid connection between the individual vessels 2a, 2b, 2d, 2n is controlled by supply valves 4a-4n (commonly denoted 4) and the pressure and/or temperature of the gas inside the supply vessels 2 are measured by sensors 5a-5n (commonly denoted 5). A refueling controller 6 is communicatively connected to the valves 4 and sensors 5. Information from the sensors 5 are used by a control algorithm executed by the refueling controller 6 resulting in control of the supply valves 4.

FIG. 1 further illustrates a receiving vessel system 7 according to an embodiment of the disclosure. The receiving vessel system comprising a plurality of receiving vessels 8a, 8b, 8n (commonly denoted 8) that is fluidly connected via fluid connections 9. The fluid connection between the individual vessels 8a, 8b, 8n is controlled by receiving valves 10a, 10b, 10n (commonly denoted 10) and the pressure and/or temperature of the gas inside the receiving vessels 8 are measured by sensors 11a, 11b, 11n (commonly denoted 11).

The systems 1, 7 illustrated in FIG. 1 includes 5 and 3 vessels respectively. This is of course only an example of number of vessels, which may deviate from these numbers. Typically, the flow to one receiving vessel 8 is controlled by one receiving valve 10, but more than the one valve per vessel illustrated in FIG. 1 may be provided. The same is true for the supply vessels of the supply vessel system.

The refueling controller (6) is according to an embodiment part of the supply vessel system hence if this system is located on a truck trailer, then the refueling controller may also be located or associated with the truck trailer. With this said, nothing hinders the refueling controller in being located in the cloud, external to the supply system or as part of the receiving system.

It should be noted that the control of the advance cascade filling according to the present disclosure may also be based on measurement of flow. Hence when flow from a supply vessel to a receiving vessel is below a threshold, bank shift is initiated. Such threshold may be a threshold of flow speed, pressure, temperature, etc. or a representation thereof.

The receiving vessel system 7 and the supply vessel system 1 is fluidly connected by a fluid connection 12 between fluid conductors 3, 9 and communicatively connected by a communication connection 13 between refueling controller 6 and consumer controller 14 or directly the receiving valves 10 and/or sensors 11. Note, that it is advantageous for the refueling controller to known pressure and/or temperature of the receiving vessels to be able to optimize the refueling. Hence, in embodiments of the disclosures, e.g. where the receiving vessel system comprises a separate fueling conductor system, no communication is needed between the refueling controller and the consumer controller/receiving valves/sensors. Further, in embodiments where the communication connection 13 fails or is not established, if the receiving vessel system comprises pressure regulated check valves on a sole fluid connection between vessels, the refueling may be established.

The communication connection 13 may obviously communicate data such as pressure and temperature readings from vessels to the refueling controller 6. The communication connection 13 may be established as a wired or wireless connection and include, especially if the refueling controller is not part of either the receiving or supply systems, an alternative or additional communication link from one of these systems to the external refueling controller 6.

The communication connection 13 may be bidirectional and include power transfer from one of the receiving and supply systems to the other. Alternatively, a dedicated power connection may be established between the systems/to an external power supply. Separate data communication and power communication connections may also be established.

The data communicated between the two systems i.e. between controllers, between components and controller(s), etc. may be based on an IR communication protocol, a wireless communication protocol, be hardwired communication, etc. Preferably, the from the receiving systems, the supply system receives pressure and temperature of the individual receiving vessels, which receiving vessels that are fluidly connected or connectable to the supply system, etc. Further emergency or abort signals should be communicated between the systems.

Communication may also, based on the match established (the match is established based on information from both of the supply and receiving systems), include receiving valve open and close commands.

In an embodiment the receiving system automatically opens for flow to the receiving vessel having the lowest flow and then maintain this one open until it is filed, in this situation, when to establish bank shift i.e. change supply vessel is determined based on the match between that receiving vessel and the plurality of supply vessels. When the first receiving vessel is filled, then automatically flow to the new receiving vessel having the lowest pressure is opened so on. In this embodiment, where the supply and receiving system valves are not controlled by the same controller, the match is as mentioned made between the receiving vessel to be filled and the plurality of supply vessels. Preferably, if time allows, the match is made between the supply and receiving vessel having the lowest pressure difference. With this said, obviously there is a lower pressure threshold difference to the match under which the match is not made. This lower threshold difference could be below 10 bar such as 9 bar, 8 bar or lower.

In systems with more than one fluid connection between supply and receiving system, there is a need to control more detailed which valves that need to open and which to close. In such embodiments simply opening according to lowest pressure as described above is not sufficient.

In an embodiment where the receiving valves are check valves such as spring-loaded valves opening at pressure equalization refueling of the receiving vessels can be made by measuring pressure and flow on the supply vessel system side. However, it is preferred, if possible, to establish communication between the receiving and supply systems for safety reasons and to be able to exchange information of temperature. Safety may also be increase by physical means without communication e.g. by matching nozzle and receptable or by using a key in relation to connection of hydrogen flow line 12.

At least it is preferred to establish at least an initial communication link 13 between the receiving and supply systems 1, 7 to be able to verify that the conductive connection 12 (hose(es), nozzle(s)) in fact is connected to the same receiving system 7. Via such initial communication link starting pressure and temperature of receiving vessels 8 may be provided to the refueling controller 6 which based thereon can calculate development in pressure and temperature during the fueling based on measurements of e.g. temperature, pressure and flow at the supply system side.

Communication during the refueling is advantageous in that the receiving vessels can be filled to 100% state of charge. If no communication of e.g. temperature of the gas in the receiving vessels is available the refueling event needs to have a conservative approach and stop several bars below target pressure to ensure that the temperature is not too high in the receiving vessel Note that even though the supply sensors 5 and receiving sensors 11 are illustrated as one sensor located external to the vessels 2, 8, this is not limiting in that several sensors for measuring different parameters such as pressure and temperature may be used and e.g. also located inside the vessels 2, 8. Further, it is noted that flow of gas to and from two or more of the supply vessels 2/receiving vessels 8 may be controlled by the same supply valve 4 and receiving valve 10 respectively.

Based on the above, the refueling system could be said to include both the supply system, the receiving system and the connections therebetween. In addition, in some situations the refueling system would also include a refueling stations where the supply system would typically be referred to as the supply storage/storage system and the receiving system would typically be referred to as the vehicle tank/tank system. The present disclosure (the advanced cascade also referred to as double cascade method) may be implemented as an alternative fill method to already known fill methods (single cascade and direct fill) of the control of a refueling station. Accordingly, no matter if the present disclosure is used as a stand-alone i.e. without a hydrogen refueling station or together with a refueling station, refuelings made according to the double cascade method would requires fluid and communicative connections, control that comply with existing standards etc.

Hence, a vessel or a plurality of vessels controllable by one valve, may be referred to as a bank, such bank comprising two vessels are illustrated in FIG. 1 denoted 15. A more details description of the bank concept, the principles of which also applies to the receiving vessel system, is found with respect to the supply vessel system implemented as a MEGC trailer illustrated on FIG. 3. Accordingly, a reference to a receiving or supply vessel in this document is a reference to a supply or receiving bank.

In contrary to prior art filling of vehicles/marine vessels, etc. of various kinds with gaseous fuels, such as hydrogen, it is mainly done by pressure equalization between supply and receiving vessels. There are often multiple vessels both in the receiving and supply system of the filling operation, but the receiving vessels are typically handled as one bank during the filling operation. This means that the maximum pressure that can be achieved in the receiving vessel is reduced or that the required pressure drop (requiring energy and lowering fueling capacity) in the supply vessels are higher than necessary. This one receiving vessel bank approach also has the effect, that when the receiving vessels are emptied i.e. gas is consumed during driving or sailing the fuel cell vehicle/marine vessel, the pressure in all of the receiving vessels of the receiving vessel system are the same when the receiving vessels are to be filling again. This has the disadvantage that that the required pressure in the supply vessels are higher than if the receiving tanks were split in multiple banks/individual controllable receiving vessels during operation/consumption.

The present disclosure suggests to solve this problem by the introducing an advanced cascade filling approach which is based on a receiving vessel system as illustrated on FIG. 1. To exploit the full potential of the advanced cascade filling approach of the present disclosure, the receiving vessel system should be divided into individually controllable (with respect to flow) receiving vessels/banks allowing hydrogen to be consumed by the fuel cell of the vehicle/ marine vessel, one receiving vessel/bank a the time/individually. Therefore, the receiving vessel system should be divided into multiple banks each comprising one or more receiving vessels 8 with its own valve 10, pressure and temperature sensor 11.

Preferably there should be at least n+2 supply vessels (pressures), where n is the number of receiving vessels. This is because then not all supply vessels are used to fill at the initial stage the receiving vessels but can save so to speak high pressure to topping up one or more receiving vessels. On the other hand, the number of supply vessels should not be unnecessarily high in that it adds complexity to the supply vessel system in terms of valves, piping, etc. and it is more time consuming to fill it up the more individual banks that have to be filled. To be able to implement the advanced cascade principles, the receiving vessel system should comprise at least two receiving vessels and preferably more.

The principles of the advanced cascade filing are that first supply vessel is used to establish a state of equilibrium with a first receiving vessel. Then a second supply vessel is used to establish a state of equilibrium with the first receiving vessel and so forth. Preferably, there are more pressure levels in the supply system than in the receiving system so that not all supply vessels are used to refuel the first receiving vessel. Typically, the same supply vessels will be used to refuel several receiving vessel such as any number between 3 and 10 or even more receiving vessels, however in some situations only two receiving are filled from the same supply vessels. The number of receiving vessels (the match) depend on the supply/receiving vessel system design, starting pressure, etc. At least the use of supply vessels by the refueling controller should be controlled so that the pressure of the "last" supply vessel is higher than the end of refueling target pressure of the "last" receiving vessel. In this way all receiving vessels can be filled directly without the use of a compressor.

The control of this is preferably made by the refueling controller, which receives information of pressure from the supply and receiving systems and based there on is able to calculate the time flow is to be established between a supply and a receiving vessel or the pressure at which the flow should be stopped.

Figure 2:
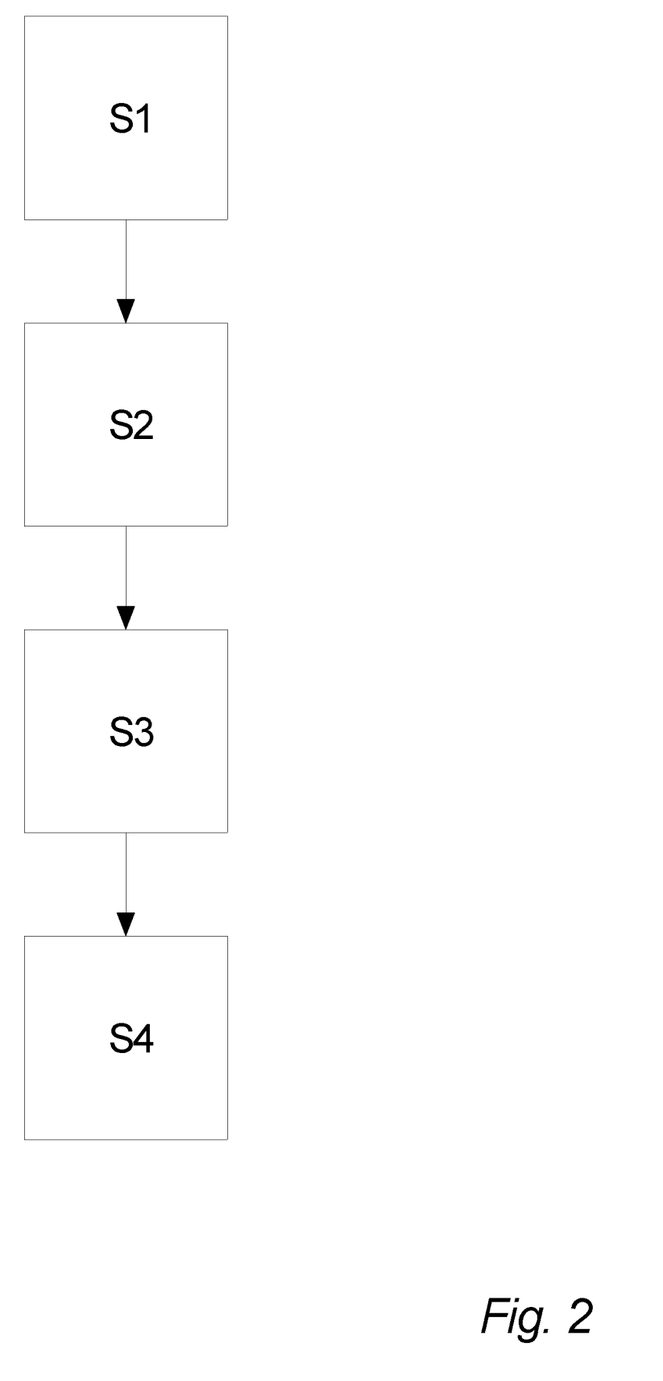
FIG. 2 illustrates a flow chart of an embodiment of the advanced cascade refueling.

Accordingly, in an embodiment the advanced cascade filling approach start with or includes an initial step (S1 of FIG. 2) of consuming hydrogen from the receiving vessel system 7 from a first receiving vessel 8a, then afterwards from receiving vessel 8b and finally from receiving vessel 8n. According to an embodiment, this consumption results, when the receiving vessel system 7 are to be refueled, in a pressure in the receiving vessel system 7 that could look like: vessel 8a is empty, vessel 8b is 30% full and vessel 8n is 100% full.

In the next step (S2 of FIG. 2), the fluid connection 12 between the supply vessel system 1 and the receiving vessel system 7 is established. The fluid communication 12 may as illustrated on FIG. 1 be a single hose connection or it may be a double or triple hose connection. In the embodiment where multiple fluid connections are established, multiple fluid connections 3, 9 (not illustrated) in the supply vessel system and in the receiving vessel system respectfully may be established.

In the next step (S3 of FIG. 2), the communicative connection 13 between the refueling controller 6 and consumer controller 14 and/or receiving valves 10 and/or sensors 11 is established. The refueling controller 6 may, as indicated, communicated directly with the relevant elements (controller 14, valve 10, sensors 11, communication interface (not illustrated)) of the receiving vessel system 7. The refueling received at least information of pressure in the individual receiving vessels 8. The communication between/from the receiving vessel system to the refueling controller 6 can be implemented by a wired connection, IR communication, RFID or through the Internet. If the communication method is not per se trusted, such as an IR based communication, where, in theory a refueling controller 6 may connect to any of two adjacent receiving vessel systems, some kind of handshake is required between the refueling controller 6 and the relevant element of the receiving vessel system, where such handshake confirms that the refueling controller is actually refueling/communicating with the receiving vessel system to which it is fluidly connected.

As mentioned, it is possible to perform a refueling without communication between the supply and receiving systems 1, 7 if the receiving valves 10 are opening based on pressure equalization.

In an embodiment, the pressure of hydrogen gas in the at least one vessel 2/bank 15 of the supply vessel system 1 is higher than the target pressure (pressure in the receiving vessels 8/vessel system 7 at the end of the refueling) of the receiving vessel system 7. Hence, even if the pressure of a supply vessel supplying a receiving vessel is higher than the pressure of the receiving vessel the refueling controller may terminated from by closing the associated supply and/or receiving vessels. This is because optimizing the overall refueling task of filling receiving vessels of the receiving vessel system, may prescribe stopping the flow before pressure equalization is reached. As mentioned, during the refueling, the refueling controller 6 controls receiving valves 10 either directly or indirectly via the consumer controller 14.

The end of refueling target pressure should be understood as the target pressure for the receiving vessels 8. Hence, this pressure could, for a given temperature, equal a predetermined 100% state of charge of the receiving vessel. Accordingly, the target pressure could also be referred to as target state of charge and does not have to be the same for all receiving vessels of the same receiving vessel system.

With reference to the example above (S4 of FIG. 2) with three receiving vessels that are ready to be refueled that are 0% (vessel 8a), 30% (vessel 8b) and 100% (vessel 8n) full, the first receiving vessel 8 to be refueled is vessel 8a, then vessel 8b and if pressure on the supply side is higher than vessel 8n and vessel 8n is capable of receiving more gas, vessel 8n is refueled. Using this principle of the advances cascade refueling principle, the highest pressure on the supply vessel system will be preserved to refuel the receiving vessel 8 having the highest pressure of the receiving vessels 8.

To illustrate this principle, the following scenario can be imagined. The remaining hydrogen gas in vessel 8a is e.g. 10 bar, in vessel 8b is e.g. 100 bar and in vessel 8n is e.g. 350 bar and the pressure in all vessels 2 of the supply vessel system 1 is 400 bar. Then if only one fluid connection 12 is established between supply 1 and receiving 7 systems, supply vessel 2a is used to refueling receiving vessel 8a completely or partly. If not completely filled by vessel 2a, the refueling continues from vessel 2b to receiving vessel 8a reaches its end of refueling target pressure. Subsequently (in time), the refueling continues with refueling of receiving vessel 8b. If the pressure of supply vessel 2a is above 100 bar (including a threshold value to ensure sufficient flow), receiving vessel 8b is filled first from supply vessel 2a, then from supply vessel 2b and if necessary, from supply vessel 2c and 2n.

The match of pressures, information relating to which is received by the refueling controller from sensors of the supply and or receiving systems, is made continuously or at least separated in time by short time periods such as a couple of seconds up to one or two minutes.

It should be noted, that if more than one fluid connection 12 is established between the supply and receiving systems 1, 7 the refueling method described above can be executed in parallel. This means that the refueling controller 6 is able to e.g. fill receiving vessels 8a, 8b simultaneously e.g. from supply vessels 8a, 8c.

It should be mentioned, that in an embodiment, the refueling event may also simply include fueling the receiving vessel system from the supply vessel system where the supply vessel system handles/refuels the vessels of the receiving vessel system as one vessel.

As described above, the refueling controller is controlling the valves of both the supply vessel system and receiving vessels system to allow the flow between the vessels of the two systems according to the principles outlined in this document including FIG. 4 below.

Figure 4:
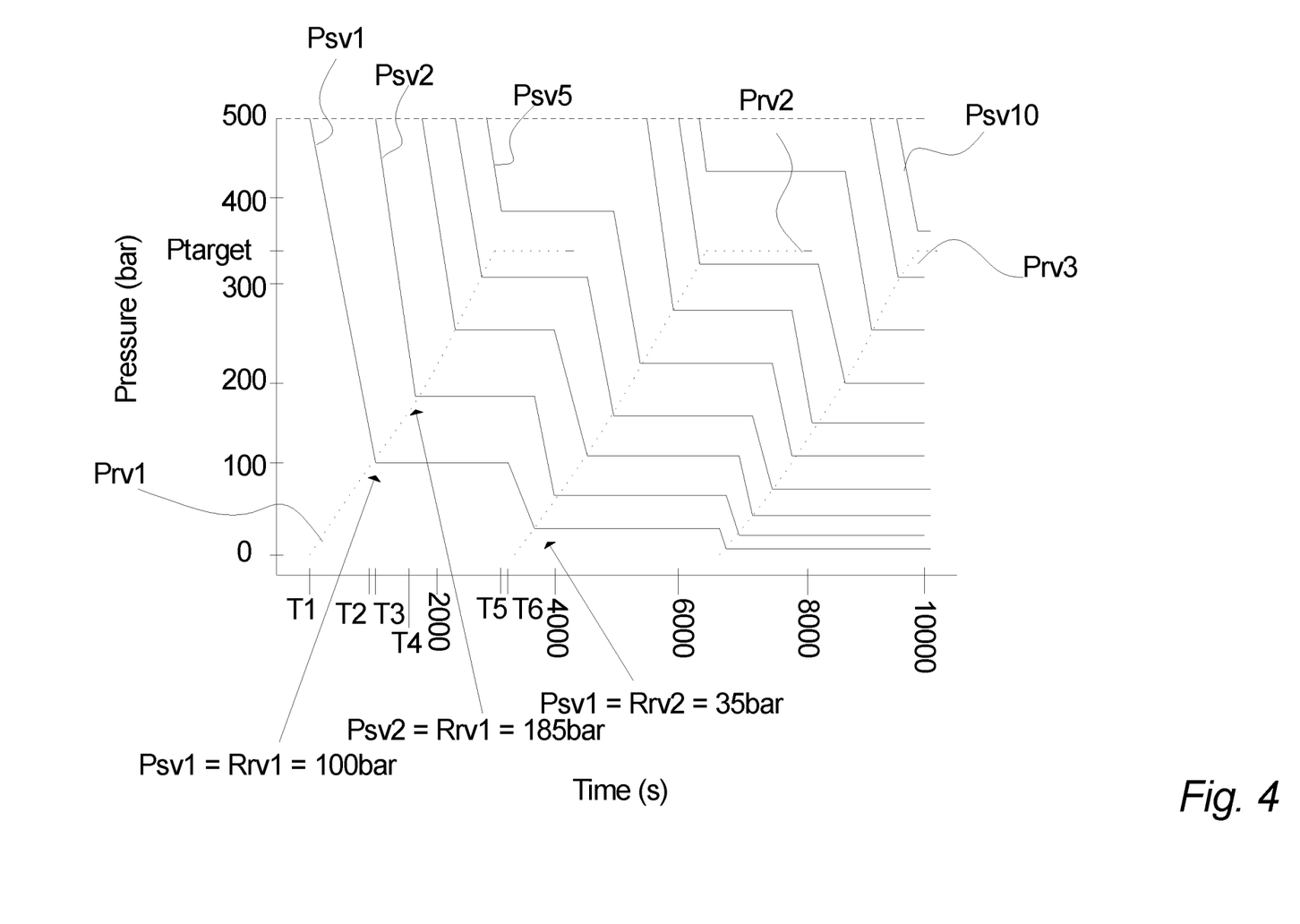
FIG. 4 illustrates an example of pressure development during a refueling event of three receiving vessels.

FIG. 4 illustrates an example of development of pressure in ten supply vessels SV1-SV10 and in three receiving vessels RV1-RV3 during a refueling event according to the present disclosure. Only the pressure development is illustrated not the receiving and supply systems. Note that in relation to the first receiving vessel RV1, the contribution from the supply vessels that are used first e.g. SV1 and SV2 is higher than the contribution from SV4 and SV5 which are used last (and SV5-SV10 are not used to fill receiving vessel RV1. Contrary to the filling of the third receiving vessel RV3, the contribution from the supply vessels that are used last e.g. SV9 and SV10 is higher than the contribution from SV1 and SV2 that are used first. In FIG. 4 the vessels and pressure development (illustrated) is associated so that the pressure Psv1 of vessel SV1 is illustrated, the pressure Psv2 of vessel SV2 is illustrated and so forth.

The supply and receiving systems are not illustrated, but one could imagen ten supply vessels individually connected to e.g. a manifold with individually controllable valves. From the manifold at least one hose is connectable to the receiving vessel system which in this example counts three vessels.

The initial conditions in the specific example illustrated in FIG. 4 are that the pressure in all supply vessels SV1-SV10 is 500 bar and the starting pressure in all receiving vessels RV1-RV3 is 0 bar. As indicated above, this is one of multiple different sets of initial conditions and therefore it is emphasized, that the description of FIG. 4 is only to illustrate the principles of the present disclosure.

The filling event begins at time T1 where a fluid connection is established between the first supply vessel SV1 and the first receiving vessel RV1. As illustrated, the pressure of the first receiving vessel Prv1 starts to increase whereas the pressure of the first supply vessel Psv1 starts to decrease.

At time T2, the pressure difference between the first receiving vessel RV1 and the first supply vessel SV1 reaches a determined threshold. In this example at time T2, the pressure in both of the first supply vessel Psv1 and first receiving vessel Prv1 is 100 Bar.

At time T3, the fueling of the first receiving vessel RV1 continues from the second supply vessel SV2. When a determined threshold is reached (at time T4), the flow from the second supply vessel SV2 is stopped and the pressure in the second supply vessel Psv2 and in the first receiving vessel Prv1 is the same, approximate 185 Bar in this example. Note that time T2 and T3 may be almost the same point in time only difference is time it takes to open and close respective valves.

The first receiving vessel RV1 is, in this way, filled from several supply vessels SV1-SV5, in this example, the fifth supply vessel SV5 is ensuring the pressure in the first receiving vessel RV1 reaches the target pressure Ptarget at 350 bar at time T5

When the first receiving vessel RV1 is full, then the second receiving vessel RV2 is to be filled. The filling of the second receiving vessel RV2 is started (at time T6) following the same principle as the filling of the first receiving vessel RV1. Hence, flow of gas is allowed between the first supply vessel SV1 and the second receiving vessel RV2. Now however, the pressure in the first supply vessel Psv1 starts at only 100 Bar, so the first supply vessel SV1 can only increase the pressure in the second receiving vessel Prv2, to approximate 35 Bar before the flow is terminated. Again, time T5 and T6 may be almost the same point in time only different is the time it takes to close and open the relevant valves.

As can be seen in FIG. 4, the contribution from the first supply vessel SV1 to the second and third receiving vessels is decreased while the contribution from the subsequent supply vessels is increased. This of course has to do with the relationship pressure between the different supply vessels/receiving vessels. In the illustrated example when no more than the three receiving vessels are to be filled, the end pressure in the first supply vessel SV1 is close to 0 Bar whereas the pressure of the tenth supply vessel SV10 is above 350 bar i.e. the target pressure of the third receiving vessel RV3.

Accordingly, the utilization of gas in the first couple of supply vessels are very high in that they are almost completely emptied (at least below 50 Bar). If a compressor is present, remaining gas can be used to consolidate pressure in other supply vessels. In this way, a new filling event can be made with a reduced number of supply vessels according to the same principles as described above.

The determined thresholds mentioned as defining when flow between a given supply vessel SV and receiving vessel RV is allowed, can be varied according to number of supply vessels, pressure in each of the supply vessels, number of receiving vessels and pressure therein.

The thresholds may as indicated above, be based on flow speed (total fill time), requirements to remaining gas in the supply vessels, temperature development in the receiving vessel, pressure in the supply/receiving vessels, etc.

An example of a threshold is pressure equalization between a supply and a receiving vessel. However, as the flow decreases towards the pressure equalization, typically 10 Bars to 50 Bars before pressure equalization occurs, the threshold is defined. If flow speed is important, the pressure threshold may be even higher. A general rule is that the higher difference in pressure the higher flow speed and thereby faster filling of the receiving vessel.

It should be noted, that if several fluid connections are available between the supply system and the receiving system, it is possible to decrease the time needed to establish a given target pressure in all of the receiving vessels by allowing simultaneous flow from two or more supply vessels to two or more receiving vessels. The number of simultaneous flows depend on the number of fluid connections that is possible to establish.

Further it should be noted that sometimes a limiting factor for the filling speed of a receiving vessel is the temperature of the receiving vessel. Therefore, when selecting a supply vessel as source, it can sometimes be relevant to use a supply vessel that has just been used as source i.e., in which gas is decompressed and thereby the temperature of the remaining gas is decreased. Using cold gas naturally allows higher pressure in a receiving vessel before a temperature limited is reached.

It should be noted, that in an embodiment, the controller, independent of the location and number of the controller(s), comprises an algorithm that is receiving input from sensors process these inputs to establish a match between supply and receiving vessels and thereby when to establish a bank shift. The match may e.g. be based on threshold values and sensor readings as described in this document. The output of the algorithm includes control signals to valves of the supply and/or receiving vessel systems.

The receiving vessel system 7 is typically part of the fuel cell drivetrain (also referred to as driveline) of a marine vessel such as a boat, ferry and the like. With this said it may also be part of a vehicle which in this case typically would be a heavy-duty vehicle type but could also be a light-duty type vehicle. As an example, during operation of a marine vessel, the consumer controller 14 controls receiving valves 10 and thereby from which receiving vessel 8 the fuel cell of the marine vessel is supplied. To optimize the advance cascade refueling principles of the present disclosure as much as possible, the consumption from the receiving vessels 8 are controlled so as to empty one receiving vessel 8 at the time or at least not to consume hydrogen gas equally from all receiving vessel 8 simultaneously. Accordingly, for the advanced cascade refueling principle to be fully exploited, the consumer controller 14 has to be programmed so that consumption of hydrogen gas from the vessels are controlled and the hydrogen gas is not just consumed equally from all vessels.

The reason for controlling the consumption from the receiving vessels is that the higher difference in pressure, the more energy is lost. Therefore, if the consumption is planed so that some receiving vessel are almost emptied and some are almost full, this would be optimal for the present advanced cascade refueling principles.

In an embodiment, to save energy during a refueling event the receiving vessels 8 have different pressure level before the fueling commence. During normal operation vehicles and especially marine vessels are refueled with significant amount of fuel on board. One reason for doing this is to reserve fuel for emergency situation, where the energy, and thereby amount of hydrogen gas in the receiving vessels, needed to get to the destination is higher than normal. This could be due to weather conditions, road blocks or similar. In the normal case where nothing of the reserve fuel has been used, the potential energy saving due to the advance cascade refueling of the present disclosure is therefore significant as vehicles or marine vessels are returned with 20-50% remaining fuel in the receiving vessel system 7.

Inevitable, this will lead to different pressures in the receiving vessels 8 and therefore the advanced cascade refueling principles of the present disclosure may apply to almost any vehicle or marine vessel (airplanes, trains or other fuel cell driven machinery) that is to be refueled.

Further, if the consumption of the hydrogen gas of the receiving vessels are controlled so as to have e.g. 10%, 50%, and 75% filled receiving vessels when commence of a refueling event, this might lead to an even further energy saving in that an even more optimal advanced cascade refueling may then be made. Note that the exact percentages full receiving vessel at refueling commence may vary in dependency of the pressure in the supply vessels 2.

In an embodiment, communication between the supply and receiving systems 1, 7 may be established during consumption/operation of the vehicle/marine vessel. Alternative, the consumer controller 14 may be instructed to reach certain pressure levels in the receiving vessels 8 when arriving at a location where a refueling can take place. In these situations, the supply vessel systems can be filled to a pressure matching these pressure levels leading to an optimized refueling event with respect to energy consumption e.g. including filling supply vessels 2, transport and the refueling event), refueling speed, end pressure in the receiving (as high end pressure as possible) and supply (as low end pressure as possible) vessels 2, 8, etc.

Reduced energy consumption may relate to optimal usage of pressure in supply vessels i.e. avoiding too much decompression from resistance in flow lines 12 and those connecting vessel in the systems 1, 7 and in the receiving vessels 8 which may lead to heating up the hydrogen gas. Further, it may relate to regulating pressure and thereby flow speed.

The lower flow speed between supply and receiving systems 1, 7, the lower energy consumption. Therefore, the match between supply and receiving vessels 2, 8 may be determined as a trade-off between energy consumption and refueling time.

Accordingly, the match and thereby the time/pressure during the refueling where supply and/or refueling vessel 1, 8 are changing may be calculated based on requirements to refueling time. A certain refueling event time requires a certain flow speed of hydrogen gas to the receiving system 7 which again requires or is determined by pressure difference between supply and receiving vessel 2, 8. Hence, by controlling the match/shift of vessels 2, 8 the time of the refueling event can be controlled.

Speed of refueling of the receiving vessels may be limited by design of the fluid connections 3, 9, 12, vessels, etc. In general, the higher flow speed, the higher temperature of gas in the receiving vessel and the temperature of gas in the supply vessel will drop. Hence a limiting factor for flow speed can be the temperature of the gas in the receiving vessel. If high flow speed is required, with an eye on temperature development in the receiving vessel as limiting factor, the supply and receiving vessel with highest pressure difference can be matched. Alternatively, or in addition, a supply vessel comprising low temperature gas (because it has recently been used as source) can be used as source (matches with a receiving vessel). In this way the cold starting temperature of the gas leave room for higher gas temperature increase before an upper temperature limit is reached.

In addition to what has already been described in relation to match between supply and receiving vessel it should be noted that the lager difference in pressure between supply and receiving vessels, the more energy is lost in the overall consumption of energy used to fill (also referred to as refuel) a receiving vessel. Hence from an energy consumption view vessels of different pressure on both supply and receiving system is optimal. In such situation, the receiving vessel having the highest pressure would first be supplied from a supply vessel having a pressure higher than that receiving vessel. does the supply vessel system comprise more than one supply vessel comprising gas above this pressure, then the supply vessel of these having the lowest gas pressure is chosen as source.

According to an embodiment of the disclosure, an alternative refueling strategy to reduce energy consumption is to only fill the receiving vessels to a level matching one operation cycle i.e. one trip of e.g. a ferry or vehicle to a destination and back. In addition to the estimated consumption of such trip, the receiving vessel system 7 is also filled with an emergency buffer in case something does not go as planned. As an example, the receiving vessel system 7 may then only be filled with 60%-95% of its capacity.

In the situation where the receiving vessel system 7 is part of a marine vessel it is, with respect to safety, important that the hose(s) have breakaways working so that if the vessel leaves harbor with the fluid connection 12 to the supply vessel system 1 still connected that no or a limited amount of leaking hydrogen gas escapes into the open air.

In an embodiment of the disclosure, the receiving vessel system comprising separate fueling conductors to each receiving vessel and in another embodiment the fueling conductors are the same as the conductors feeding the fuel cells of the vehicle/marine vessel. Further, in the embodiment where the receiving vessel system is part of a marine vessel, it may comprise a compressor and valves controllable by the consumer controller. Hence, the design of the receiving vessel system is determining for the level of involvement of the consumer controller during a refueling.

In the embodiment where the receiving vessel system comprises a compressor, it is possible for the consumer controller to facilitate pressure consolidation among the receiving vessels. This is advantageous in that then it is possible to establish the optimal pressure in different receiving vessel to fully exploit the potential of the advanced cascade refueling principles of the present disclosure e.g. to perform a faster refueling event. In fact, if communication between the consumer controller and the refueling controller or another controller having knowledge of pressure levels in the supply vessels, the consumer controller based on pressure related information form the supply vessel system, is able to control the consumption of hydrogen gas from the individual receiving vessel to have a pressure before a refueling event that is determined by the pressure hydrogen gas in the supply vessels. Note that such compressor may also be comprised by the supply vessel system.

In an embodiment of the disclosure, consumption of hydrogen gas by the fuel cells are controlled so as to ensure that the pressure in the receiving vessels is not the same i.e. the consumption is asynchronous with respect to which of the receiving vessels are source to the consumed hydrogen gas i.e. not use all receiving vessels as source at the same time. This asynchronous supply from the receiving vessels is advantageous in that in this way the receiving vessel system is prepared for being refueled according to the advanced cascade refueling principles of the present disclosure.

One way of consuming hydrogen gas from the receiving vessel system is to only consume hydrogen gas from at least one receiving vessel to a determined pressure level of e.g. half the pressure level of the receiving vessel at the beginning of the consumption. Hence, the consumer controller monitors the pressure in the receiving vessel that supplies the fuel cell and when the determined pressure level is reached, the consumer controller change receiving vessel and continues supplying the fuel cells from another of the receiving vessels.

Another way of consuming hydrogen gas from the receiving vessel system is to consume as much as possible, preferably emptying a receiving vessel, at least to a level below 5% of the pressure at the beginning of the consumption, before changing source to another receiving vessel.

Yet another way is to control the consumption so as to ensure that the receiving vessels, before a refueling is to happen, comprise at least two different pressures. Such as one receiving vessel is empty (e.g. below 5% of the pressure at the beginning of the consumption), one receiving vessel is half empty (e.g. 50% of the pressure at the beginning of the consumption) and one receiving vessel is full or at anther percentage full with respect to the pressure at the beginning of the consumption.

The determined level to which a receiving vessel is emptied could be defined as 0%, 10%, 20%, 30%, 40%, 50%, 60%, 70%, 80%, 90% and any percentages therebetween of the pressure level of the receiving vessel at the beginning of the consumption thereof.

As indicated above, the flow speed depends on the pressure difference between supply and receiving vessel. Hence, if the volume of a receiving vessel is e.g. below 500 L i.e. a minor receiving vessel, a lower limit for the flow speed may be 30 g/s whereas if the receiving vessel is between e.g. 500 L to 9000 L i.e. a larger receiving vessel, a lower limit for the flow speed may be 100 g/s. Hence, when it is established that such flow speed is reached (either be calculation or measurement) the refueling controller starts evaluating if the supply storage should be changed to increase flow speed (also referred to as flow rate).

As can be understood from the above, to be able to introduce the advanced cascade principles of the present disclosure, the number of components such as vessels, valves and fluid conduits are increased. This increases the cost of the required system but also redundancy and may have the effect, that a refueling may continue e.g. according to normal cascade principles even if one or more of these components may fail.

Figure 3:
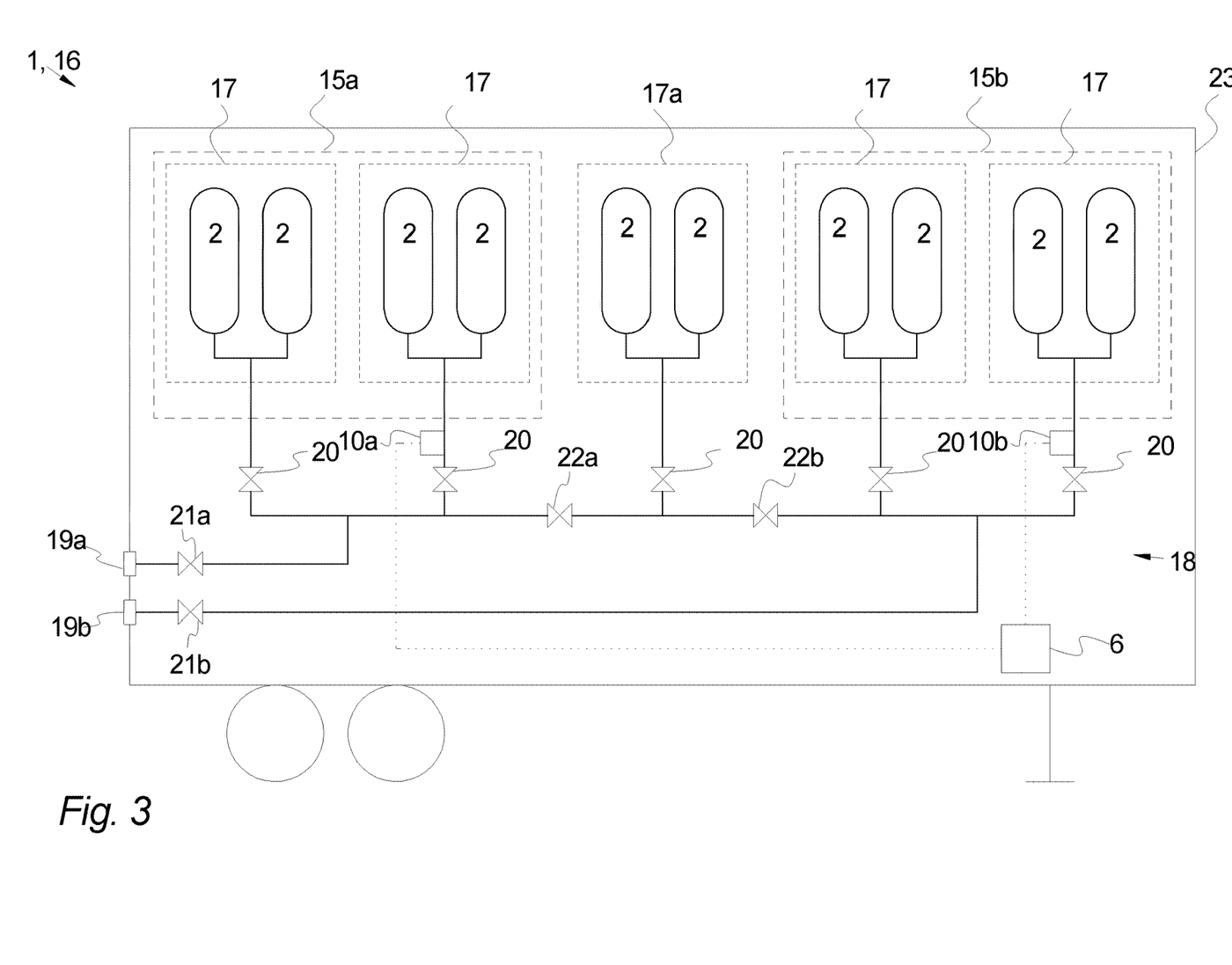
FIG. 3 illustrates an example of a supply vessel system in the form of a MEGC trailer.

FIG. 3 illustrates a supply vessel system 1 which in an embodiment of the disclosure is implemented as a MEGC trailer 16. Obviously, the supply vessel system 1 could be implemented as any kind of truck trailers having several independently controllable vessels 2/banks 15 or it could be a stationary refueling station. In this particular embodiment the supply vessel system 1 is implemented as a MEGC trailer comprising a first gas bank 15a and a second gas bank 15b. The first gas bank may furthermore be divided in two gas sections 17, and the second gas bank may also be divided in two gas sections 17. Furthermore, the MEGC trailer according to this embodiment comprises a fifth gas section 17a. Thus, the MEGC trailer according to this embodiment comprises a total of five gas sections, and each of these gas sections comprises two supply vessels 2. Note, however, that in other embodiments, the MEGC trailer of the disclosure is not restricted to five gas sections, two gas vessels per gas section, or two gas sections per gas bank. Typically, the number of vessels, sections and banks is a customer choice based on the application in which the MEGC trailer is to be used and thus any combination thereof that is physically and legally allowed to locate on a MEGC trailer is possible.

The embodiment of the MEGC trailer 16 comprises a fluid conduit system 18, which fluidly connects the gas sections 17/vessels 2, and which is fluidly connected to a first outlet connection 19a and a second outlet connection 19b. the fluid conduit system may be similar to the fluid connections denoted 3 on FIG. 1. Each of the gas sections 17 has an associated section valve 20, which is configured to open and close the fluid connection to the respective gas sections. The section valve 20 may be the valve which above is referred to as supply valve 4. Similarly, the first outlet connection 19a has an associated first coupling valve 21a, and the second outlet connection 19a has an associated second coupling valve 21b. The fluid conduit system 18 further comprises a first bank valve 22a and a second bank valve 22b, both located in between the two gas banks 15a-15b, and such that a gas section 17a is located between the first bank valve 22a and the second bank valve 22b.

Further, the MEGC trailer 16 may comprise a trailer casing 23. A MEGC trailer is understood as a tube trailer comprising a plurality of vessels i.e. at least two vessels such that the trailer can store fluids at two different pressures. A block and bleed valve may be used to isolate one or more vessels or sections of the MEGC trailer. Hence, the supply vessel system may not be as advanced as the one implemented as a MEGC trailer illustrated on FIG. 3.

In various embodiments, valves of the MEGC trailer 16 comprise air-operated valves, solenoid valves, directional control valves, and/or gate valves. Air-operated valves can for example be operated using an external high-pressure source coupled to the trailer using a dedicated connection. Such a high-pressure source can for example be a compressor at a hydrogen refueling station. Alternatively, air-operated valves can for example be operated using an internal high-pressure source, for example from a compressed air brake system.

Air-operated valves may be operated by a high-pressure source/vessel pressurized by a compressor internal or external with respect to the MEGC trailer or from a truck connected or delivering the MEGC trailer. Solenoid valves can for example be powered by a battery, e.g. a truck battery.

Generally, embodiments of the disclosure are not restricted to any particular types of valves, and a person skilled in the art may select any valves, suitable for realizing the disclosure. Similarly, the supply vessel system 1 is not restricted to any particular type of gas vessel 2, and a person skilled in the art may select any gas vessels 2, suitable for realizing the disclosure. Particularly, gas vessels should be able to withstand and approved to be used for transportation of gaseous fluid pressures up to, for example, 500 bar, but gas vessels according to the disclosure are not restricted to this maximum pressure. Gas vessel 2 used in the gas sections could in principle be any type as longs as they comply with local requirements to transport and storage of gaseous fluids in particular hydrogen gas.

The valves of the embodiment illustrated on FIG. 3 are distributed such that if all section valves 20 are open, at least one bank valve 22a-22b is closed, the second coupling valve 21b is closed, and the first coupling valve 21a is open, then pressurized gaseous fluid in the gas vessels 2 of the first gas bank 15a may exit these gas vessels 2 via the fluid conduit system 18 through the first outlet connection 19a. Or similarly, these gas vessels 2 may receive pressurized gaseous fluid from an external gas source via the fluid conduit system 18 through the first outlet connection 19a. Meanwhile, gas vessels 2 of the second gas bank 15b cannot receive or release pressurized gaseous fluid.

In a similar manner, if all section valves 20 are open, at least one bank valve 22a-22b is closed, the first coupling valve 21a is closed, and the second coupling valve 21b is open, then pressurized gaseous fluid in gas vessels 2 of the second gas bank 15b may exit or enter these gas vessels via the fluid conduit system 18 through the second outlet connection 19b, while gas vessels 2 of the first gas bank 15a cannot receive or release pressurized gassed fluid.

If all section valves 5 are open, at least one of the bank valves 9a-9b is closed, and both bank valves 7a-7b are open, the gas vessels 4 of each independent gas bank 2a-2b may receive or release pressurized gaseous fluid, e.g. gas vessels 4 of the first gas bank 2a may release pressurized gaseous fluid while gas vessels 4 of the second gas bank 2b receives pressurized gaseous fluid.

If all section valves 5 are open and both bank valves 9a-9b are open, pressure equalization is performed. In this particular situation, the direction of the flow of gaseous fluid is determined by pressure inside the vessels of the gas banks 2a-2b and is ultimately ending with pressure equalization between the gas vessels 4 of the two banks 2a-2b.

If the all section valves 20 are open and the first bank valve 22a is open, while the second bank valve 22b is closed, then the gas vessels 2 of the gas section 15a located between the bank valves 22a-22b may receive or release pressurized gaseous fluid in parallel with gas vessels 2 of the first gas bank 15a. Accordingly, the gas vessels 2 of gas section 17 are included in gas bank 15a. If instead all section valves 20 are open and the second bank valve 22b is open, while the first bank valve 22a is closed, then the gas vessels 2 of the gas section 17 located between the bank valves 22a-22b may receive or release pressurized gaseous fluid in parallel with gas vessels 2 of the second gas bank 15b. Accordingly, the gas vessels 2 of gas section 17 is included in gas bank 15b. Hence, by controlling the first bank valve 22a and the second bank valve 22b, it is thus possible to control the number of gas vessels 2 and thereby volume in the gas banks 15a-15b which contribute when pressurized gaseous fluid is received or released by the supply vessel system 1/MEGC trailer 16.

For embodiments of the disclosure, as the embodiment illustrated in FIG. 3 where one gas section 17 is located between bank valves 22a-22b, any number of gas sections located between bank valves may be considered as part of the first gas bank or as part of the second gas bank, depending on the configuration of the bank valves.

In addition, the embodiment of the MEGC trailer 16 according to the disclosure illustrated in FIG. 3 may comprise a first sensor unit 5a and a second sensor unit 5b. In the specific embodiment illustrated in FIG. 3, the first sensor unit 5a is associated with a gas section 17 of the first gas bank 15a, such that it may record a physical state of the pressurized gaseous fluid contained in gas vessels 2 of this gas section 17. If all section valves 20 are open and one of the bank valve 22a, 22b is closed, the first sensor unit 5a may record a physical state of the pressurized gaseous fluid contained in gas vessels of all section of the first gas bank 15a and thereby of the first gas bank 15a. Similarly, the second sensor unit 5b is associated with a gas section 17 of the second gas bank 15b, such that the second sensor unit 5b may record a physical state of the pressurized gaseous fluid contained in gas vessels 2 of the gas section 17, or of the second gas bank 15b, depending on status of section valves 20 and bank valves 22a, 22b.

The physical state that the sensor units 5a-5b record may for example be pressure and/or temperature. Note that embodiments of the disclosure are not restricted to two sensor units, and may for example comprise one, three, four, five, or more than five sensor units, for example distributed among gas sections of the supply vessel system 1/MEGC trailer 16. A sensor unit may typically either measure a single or multiple properties, including a physical state, of a pressurized gaseous fluid for each vessel, section and/or bank of a MEGC trailer or of the MEGC trailer.

It should be mentioned that the measurements from a sensor unit may vary depending on flow in the conduit system 18. Accordingly, if e.g. pressure is measured as sections valves are open, allowing gaseous fluid to move from one section to another (pressure equalization), the measured pressure may settle after a settling period. This is because the flow affects pressure measurements and performing a measurement which is indicative of an equilibrium pressure may require waiting a settling time measured in seconds such as below 30 seconds after flow has ended. Similarly, when section valves are opened and flow begins, the temperature may increase with pressure. Hence, a temperature measurement may also require a settling time to pass.

It should be mentioned that preferably at least the section valves and bank valves are pressure regulating valve so that connection between two gas sections or gas banks with different pressure can be established without instant pressure equalization.

In the embodiment of FIG. 3, the sensor units 5a-5b are communicatively connected to a monitoring unit and/or control unit 6, which receives representations of the physical states that the sensor units 5a-5b record, to generate supply vessel system 1 information data, which is stored on a data memory. This data memory may, for example, be physically connected to the refueling controller 6, e.g. located on the MEGC trailer 16, or it may, for example, be a cloud-based data memory, with which the refueling controller 6 communicates wirelessly. The exact specifications of the refueling controller may be chosen accordingly by a skilled person.

Trailer information data may for example be used to monitor a supply vessel system 1 or be used as basis for controlling the supply vessel system 1. A user may for example perform reloading on the basis of trailer information data comprising records of pressure of pressurized gaseous fluid, e.g. if a recorded pressure in the second gas bank 15b is below a pressure threshold, or if a differential pressure between the two gas banks 15a-15b are below a pressure threshold. Such control may also be performed automatically by a control unit communicatively connected to the refueling controller 6.

Monitoring of the supply vessel system 1 may as mentioned be used for leakage detection. It may also be used in planning of routing of a trailer returning to a trailer fill station. Hence, if a remaining pressure of a trailer is communicated to a central computer and the same central computer knows that a particular receiving vessel system 7 needs hydrogen. Then based on information of pressure in the trailer, the central computer may advise the truck driver to pass the particular receiving vessel system 7 to dump off remaining hydrogen into a local storage or into the receiving vessel 8 e.g. of a marine vessel. In addition, information of remaining pressure in gas sections of a trailer can be used to planning of production of hydrogen i.e. what is needed to load the trailer again. The is especially advantageous when the central computer (also referred to as cloud computer) is communicating with a fleet of trailers.

A user or a control unit 6 may also control, for example, bank valves 22a-22b based on trailer information data. For example, if a total amount of pressurized gaseous fluid loaded on the MEGC trailer 1 is above a certain threshold, the bank valves 22a-22b are configured to have a smaller gas bank of lower pressure, and a larger gas bank of higher pressure, e.g., referring to the embodiment illustrated in FIG. 3, the first bank valve 22a is open and the second bank valve 22b is closed, such that two gas sections 17 contribute to the first gas bank 15a, and three gas sections 17, 17a effectively contribute to the second gas bank 15b. Then, if the total amount of pressurized gaseous fluid loaded on the MEGC trailer 16 is below a certain threshold, the bank valves 22a-22b are configured to have a larger gas bank of lower pressure, and a smaller gas bank of higher pressure, e.g., referring to the embodiment illustrated in FIG. 3, the first bank valve 22a is closed and the second bank valve 22b is open, such that three gas sections 17, 17a effectively contribute to the first gas bank 15a, and two gas sections 17 contribute to the second gas bank 15b. As such, the bank valves 22a-22b control whether the gas sections 17 of the MEGC trailer 1 have a 40/60 distribution or a 60/40 distribution among the two gas banks 15a-15b, which may be based on trailer information data recorded using at least one sensor unit.

Bank valves 22a-22b may also be controlled based on whether the two outlet connections 19a-19b are fluidly connected to a hydrogen refueling station comprising a compressor to perform reloading among gas banks 15a-15b of the MEGC trailer 1.

The gas section 17a located between the bank valves 22a-22b may in some embodiments be understood as a third gas bank. Such embodiments may additionally comprise, e.g., a third bank valve, a third coupling valve, and/or a third outlet connection, fluidly connected to this third gas bank. In fact, embodiments of the disclosure are not restricted to any number of gas banks, and the gas banks may, individually, have any distribution of gas sections and gas vessels. Increasing the number of gas banks to more than two banks may for example allow improved cascade fueling. It may further allow more detailed reloading schemes.

The MEGC trailer illustrated in FIG. 3, is in principle configurable to the extent the application in which it is to be used requires so. Hence, by adding several bank valves, several gas banks, including one or more gas sections, can be established. With this said, there is a limit in the conduit system 18, because the more flexibility, the larger conduit system. Due to complexity of the trailer design, large conduit systems are not desired and when required, the complexity can be reduced by including one or more manifolds as will be explained below.

It should be mentioned, that more than two gas banks may be advantageous especially with respect to advanced cascade fueling from the supply vessel system 1 of the trailer 16. Several gas banks with different pressures may be established either when the trailer is loaded or when by means of a compressor on site or on the trailer. Hence, the vessels 2 may have fueling storage (e.g. 700-1000 bar), high-pressure storage (e.g. 500 bar) and medium/low-pressure storage (50-300 bar) in a trailer.

Reload of gas between vessel of the supply vessel system may for example be performed by utilizing a compressor, e.g. gas from the second gas bank may flow to be compressed by a compressor, and then flow back to the first gas bank. Utilizing a compressor of an external facility is advantageous, since the compressor do not have to be located on the trailer, which would otherwise require space and a power source.

Further, having at least two gas banks the volume of which can be changed is advantage in that it has the effect, that the same trailer can be optimized to be used as storage for a hydrogen refueling station mainly fueling heavy-duty vehicles or marine vessels and light-duty vehicles. Refueling of heavy-duty vehicle or marine vessels requires a large volume of hydrogen compared to refueling of a light-duty vehicle. Therefore, a MEGC trailer used as supply vessel system for mainly heavy-duty vehicles or marine vessel is preferred to have larger high-pressure gas bank compared to a MEGC trailer mainly used as storage for refueling of light-duty vehicles.

Further, having at least two gas banks the volume of which can be changed is advantage in that it has the effect, that a fill made directly from the trailer can be used according to cascade principles. Hence the more gas banks, the more cascade steps and the more efficient fueling.

An external facility is in this document understood as a stationary hydrogen refueling station or a stationary hydrogen production facility such as an electrolysis plant. Accordingly, even though the MEGC trailer can be connected to such a stationary facility, this does not preclude the MEGC trailer from being connected to a temporary facility. Hence, an external facility may also include a temporary facility which in this context is understood as any kind of vehicle (air (drones, airplanes, etc.), water (ships, etc.) or land (light-duty and heavy-duty vehicles, trains, etc.) vehicles).

Placing a gas section between the first and second bank valves is advantageous in that it has the effect, that the volume of this gas section can be added to either one of the two gas banks. Thereby the volume used for reloading (e.g. the volume in which pressure is increased) can be reduced leading to a faster pressure increase and improved the station performance when the MEGC trailer is used as storage for a hydrogen refueling station. Alternative, if time is not an issue a larger volume of the trailer, in which pressure can be increased, can be established due to the possibility of changing volume of the banks. This is especially relevant with respect to refueling of heavy-duty vehicles i.e. more intense refuelings.

Note however that some embodiments of the supply vessel system 1/MEGC trailer 16 may have more than two gas banks, for example three gas banks, four gas banks, five gas banks, or more than five gas banks. Advantages of such embodiments are that they have greater flexibility for reloading among gas banks and provide improved cascade filling.

From the above it is now clear that the present disclosure relates to a supply vessel system comprising a plurality of supply vessels via which at least two preferably three or more individually controllable receiving vessels of a receiving vessel system can be refueled to a determined state of charge, preferably 100% SOC. The refueling is controlled by a refueling controller. The refueling controller may be part of the supply vessel system, the receiving vessel system or external to these systems such as central or cloud server. In the situation where the supply vessel system is implemented (complete or partly) as a truck trailer, the refueling controller may be located as part of the truck trailer. The refueling controller receives information of pressure of the receiving vessels and know about or receives pressure information of pressure of the supply vessels. Based on the information of pressure, the refueling controller determines which of the supply storages that is to be used to refuel which of the receiving vessels i.e. it matches a supply vessel and a receiving vessel prior to a refueling event or at least prior to establishing flow between the matched supply and receiving vessel.

The receiving vessel system is part of a vehicle, marine vessel, train or other fuel cell driven movable arrangements. In an embodiment, where the receiving vessel system is part of a marine vessel where the marine vessel is having a consumer controller which according to an embodiment of the disclosure controls consumption from the receiving vessels to establish at least two different pressure levels in vessels of the receive vessel system.

The invention claimed is:

1. A method of refueling a receiving vessel system with a hydrogen gas from a supply vessel system,
  the receiving vessel system is fluidly connected to the supply vessel system via at least one hydrogen flow line,
  the receiving vessel system comprising a plurality of receiving vessels and receiving vessel valves,
  the supply vessel system comprising a plurality of supply vessels and supply vessel valves,
  wherein the flow of hydrogen gas from the supply vessel system to the receiving vessel system is controlled by a refueling controller,
  the method is characterized in that the refueling controller:
    establishes information related to pressure from at least one of the plurality of supply vessels and from at least one of the plurality of receiving vessels,
    based on the established information, determine a match between at least one supply vessel and at least one receiving vessel,
    based on the match, controlling the status at least one supply vessel valve and at least one receiving vessel valve to allow flow between the matched supply vessel and receiving vessel so that the at least one of the plurality of receiving vessels are filled to its target pressure by flow of hydrogen gas directly from two or more of the plurality of supply vessels, and
    wherein at least one receiving vessel is only filled to a reference fill and,
    wherein the reference fill is 60-95% of the capacity of said receiving vessel.

2. The method according to claim 1, wherein the supply vessel and a receiving vessel are matched if the pressure in the supply vessel is higher than the pressure in the receiving vessel, wherein the difference is at least 10 bar.

3. The method according to claim 1, wherein the same receiving vessel is filled from at least a first and a second supply vessels before being completely filled, wherein the pressure of the first supply vessel is lower than the pressure of the second supply vessel, and wherein the receiving vessel is supplied from the first supply vessel and subsequently from the second supply vessel.

4. The method according to claim 1, wherein the refueling controller receives pressure information from the plurality of supply vessels and/or receiving vessels continuously during the refueling.

5. The method according to claim 1, wherein the refueling controller is located at a truck trailer.

6. The method according to claim 1, wherein a fluid connection between supply vessel system and receiving vessel systems is double or triple.

7. The method according to claim 1, wherein the receiving vessels of the receiving vessel system is filled to a temperature compensated target pressure.

8. The method according to claim 1, wherein a consumer controller controls the consumption of hydrogen gas from the receiving vessel system so as reduce pressure in the receiving vessel asynchronously.

9. The method according to claim 1, wherein the same supply vessel is used to refuel at least 3 receiving vessels.

10. The method according to claim 1, wherein the refueling controller is rematching one supply vessel that has been used as source for one receiving vessel with another receiving vessel.

11. The method according to claim 1, wherein at least two receiving vessels are filled to their target pressure with hydrogen gas directly from at least three different supply vessels.

12. The stationary refueling station comprising a supply vessel system and a receiving vessel system controlled according to claim 1, wherein the receiving vessel system is movable.

13. A refueling system configured for refueling of a receiving vessel system comprising a plurality of receiving vessels, a temporary refueling system comprising a plurality of supply vessels,
   wherein the receiving vessel system is fluidly connected to the supply vessel system via at least one hydrogen gas gaseous connection,
   wherein a refueling controller is configured to control the flow of hydrogen gas from the supply vessel system to the receiving vessel system, based on information established related to pressure inside at least one of the plurality of supply vessels,
   wherein the refueling controller, based on the received pressure information, is configured to determine a pressure match between at least one supply vessel and at least one receiving vessel, and based on the match the refueling controller is configured for controlling the status at least one supply vessel valve to allow flow of hydrogen gas from the supply vessel to the matched receiving vessel,
   wherein the matched receiving vessel is only filled to a reference fill, wherein the reference fill is 60-95% of the capacity of said matched receiving vessel,
   wherein the plurality of supply vessels is part of a MEGC trailer for transportation and temporary storage of a pressurized gaseous fluid, wherein the MEGC trailer comprising:
   said supply vessels, wherein said supply vessels comprise at least two gas banks, wherein each of said two gas banks comprises at least one gas section, wherein said at least one gas section comprises at least one gas vessel, wherein said at least one gas vessels is configured for temporary storage of said pressurized gaseous fluid;
   a plurality of section valves, wherein each gas section is associated with one of said plurality of section valves which is configured for controlling flow of said pressurized gaseous fluid to and from said gas section;
   a fluid conduit system arranged to fluidly couple, through said section valves, gas sections within each of said at least two gas banks, wherein said fluid conduit system comprises a first coupling valve and a second coupling valve;
      said first coupling valve is configured for establishing a fluid connection between a first of the at least two gas banks and a first outlet connection and
      said second coupling valve is configured for establishing a fluid connection between a second of the at least two gas banks and a second outlet connection,
      wherein said first and second outlet connections are both configured for connecting said fluid conduit system to an external facility and thereby facilitate two-way gaseous fluid communication between the MEGC trailer and the external facility, and
   wherein the fluid conduit system furthermore comprises a first and a second bank valve between which an additional gas section is connected to the fluid conduit system via an additional section valve,
   wherein said first and second bank valves and said additional section valve are controllable so as to change the volume of at least one of the at least two gas banks with the volume of said additional gas section.

14. The refueling system according to claim 13, configured to implement a method of refueling a receiving vessel system with a hydrogen gas from a supply vessel system, the receiving vessel system is fluidly connected to the supply vessel system via at least one hydrogen flow line, the receiving vessel system comprising a plurality of receiving vessels and receiving vessel valves, the supply vessel system comprising a plurality of supply vessels and supply vessel valves, wherein the flow of hydrogen gas from the supply vessel system to the receiving vessel system is controlled by a refueling controller, the method is characterized in that the refueling controller: establishes information related to pressure from at least one of the plurality of supply vessels and from at least one of the plurality of receiving vessels, based on the established information, determine a match between at least one supply vessel and at least one receiving vessel, and based on the match, controlling the status of at least one supply vessel valve and at least one receiving vessel valve to allow flow between the matched supply vessel and receiving vessel so that the at least one of the plurality of receiving vessels are filled to its target pressure by flow of hydrogen gas directly from two or more of the plurality of supply vessels.

15. The refueling system according to claim 13, wherein the refueling system is temporary.

16. The refueling system according to claim 13, wherein the number of supply vessels of the supply vessel system is at least n+2, where n is the number of receiving vessels of the receiving vessel system.

17. The refueling system according to claim 16, wherein a controller is configured to control the status of at least one of the section valves, coupling valves and bank valves based on the trailer information data.

18. The refueling system according to claim 16, wherein said fluid conduit system comprises three or more bank valves, configured for controlling the number of gas sections included in three or more gas banks.

* * * * *